Patented Jan. 1, 1952

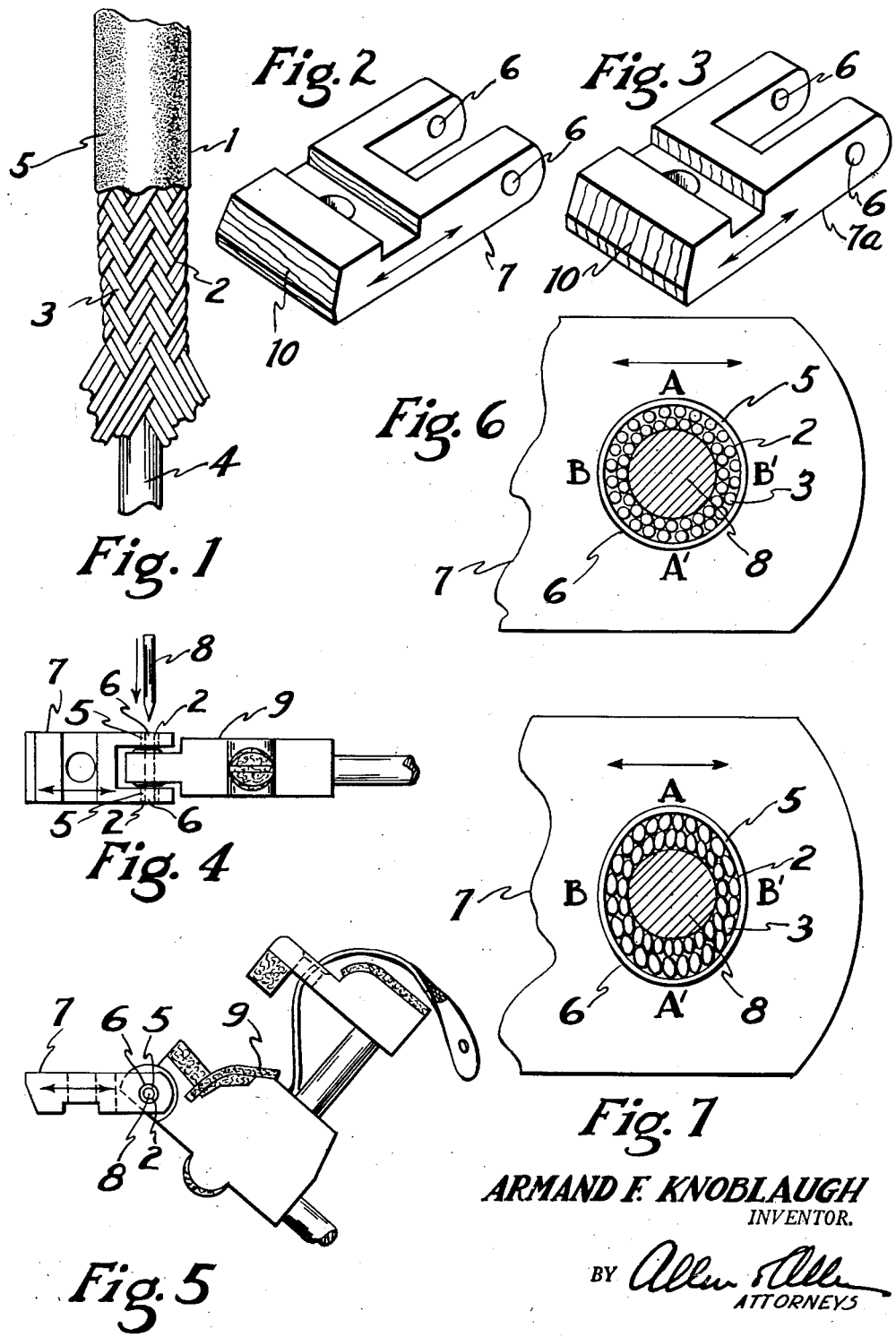

2,580,438

UNITED STATES PATENT OFFICE 2,580,438

BEARING ASSEMBLY

Armand F. Knoblaugh, Cincinnati, Ohio, assignor to The Baldwin Company, Cincinnati, Ohio, a corporation of Ohio Application January 3, 1949, Serial No. 68,846

9 Claims. (Cl. 308—238)

1

This invention relates to bearings. It is particularly applicable to pin bearings such as are used in pianos in the pivotal connections forming part of the actions of such instruments.

A primary object of the invention is to provide a bearing assembly for the use stated, having the desired physical characteristics and which can be made economically from economical materials.

Another object is to provide a bearing assembly, in keeping with the foregoing object, so constructed that although the assembly may be exposed to considerable ranges of atmospheric humidity, desired operating characteristics are not disturbed.

The manner in which the above objects are attained, and the attainment of other objects which will be pointed out later herein or will become apparent to those skilled in the art on reading this specification will now be described in detail, with reference to the accompanying drawings forming a part hereof, wherein:

Figure 1 is a fragmentary view of exemplary bearing material which may be used in my invention;

Figure 2 is a perspective view of an exemplary bearing holder;

Figure 3 is a perspective view of a bearing holder such as that of Figure 2, showing a somewhat different selection of material for the holder;

Figure 4 is a plan view of a bearing assembly as a piano action member, comprising a bearing holder such as those of Figures 2 or 3 containing bearings derived from material such as shown in Figure 1, being pinned to another piano action member shown partially;

Figure 5 is a side view showing the two action members of Figure 4 pinned together to form a pivotal connection of the two members;

Figure 6 is a partial side view of a bearing assembly, showing the bearing containing end with a center pin inserted in the bearings; and Figure 7 is also a partial side view of a bearing assembly, illustrating in exaggeration dimensional changes in the assembly due to increased moisture content resulting from increased atmospheric humidity.

The centers in a piano action, i. e., the pivotal connections on which the action members swing back and forth, must be low in friction, quiet in operation, and durable and firm with little sideplay or "knock," under the impacts imposed in piano playing. To provide these centers, the bearings or bushings therefor in which the action shafts or center pins oscillate on their axes, must

2 be constructed to obtain the characteristics desired. In the current practice of the art such bearings are formed by a considerable number of manual operations employing cloth (known as bushing cloth) woven from sheep's wool as a raw material since it has desired qualities, which operations I have described in my copending application Serial No. 20,316 filed April 10, 1948, and entitled Pin Bearings, Material Therefor, and Method of Making, and to which I have also referred in my copending application Serial No. 33,404, filed June 16, 1948, and entitled Bearings, Bearing Material, and Method of Fabricating Bearings, of which copending applications the present case is a continuation-in-part. As part of these bearing forming operations in the current practice, desired density and resilience are impressed in the bearings by a means and method which were set forth in the copending application Serial No. 20,316 and which I shall redescribe here for purposes of explaining the present invention.

Upon insertion in the bifurcated bearing holders (known as flanges in the piano art) so as to become circumferential in the respective pairs of bearing holes therein, the portions of wool bushing cloth for bearings in the current practice comprise tight cylinders without any appreciable openings for the center pins. To provide the center pin space, these cylinders after the glue for uniting them with the bearing holders has hardened are opened in a preliminary manner by a slender rotating needle inserted momentarily along the axis of the bearing formation. Following this a metal rod of the diameter of the center pin is driven with a forward rotary motion into the preliminary opening, radially compressing the cloth cylinders against the bearing holders, to a considerably denser and more resilient condition. With the rod inserted the assembly is then dipped in water for a short time to permit the wool cylinders to absorb moisture, and the assembly is allowed to dry before removing the rod. Wool, of course, absorbs water appreciably and if unopposed will swell with moisture absorption. However under the confined condition imposed as described the wool cylinders are substantially prevented from altering their dimensions with moisture absorption. They therefore "fatigue" to the denser condition, and upon drying are "set" to this condition, with increased resiliency, suitable for the use intended. Finally, upon removal of the compression rod, the assembly is ready for use as a bearing combination, with center pin holes in the wool cylinders formed to a size adapted to a particular center pin and in alinement brought about by the straight compression rod. Piano action centers as completed are firm but free with moderate radial force between the center pins and their bearing assemblies.

As has thus been pointed out, the sensitivity of wool to moisture is advantageous in making bearings for piano action centers according to the existing art. This same sensitivity, however, is a disadvantage when pianos containing such centers are used under conditions of high atmospheric humidity. With considerable increase in humidity the wool bearings again absorb appreciable moisture from the atmosphere, but their inherent swelling is prevented by confinement between the center pins and the bearing holders. As a consequence the wool bearings exert appreciable additional radial force against the center pins, increasing the friction in the centers to an extent which quite often hinders, and under extreme conditions prevents, the satisfactory operation of a piano. The use of moisture inhibitors, such as the insertion of paraffin oil in the bearings, delays but does not prevent the incursion of moisture and consequent tightening of the centers.

I have discovered, in my present invention, a bearing assembly for the use intended which is so composed that its parts cooperate with each other in minimizing the effects of moisture due to atmospheric humidity. The assembly otherwise is constructed to have desired physical characteristics and inexpensive materials and fabrication; and while its parts are not individually insensitive in their dimensions to moisture, briefly in a practice of my invention, I provide a construction such that a dimensional change in one part counterbalances the effect of another. In carrying out the invention it is not beyond its scope to employ parts of various compositions selected in combination for the purpose. As a current preference however, I use for bearing material composite material such as illustrated at 1 in Figure 1 whose bearing functions reside in a tight tubular braid of nylon filamentary elements, and for bearing holders I employ holders comprised of wood, such as illustrated in Figures 2 to 7 inclusive.

While the bearing material 1 of Figure 1 has been specified both as to composition and fabrication in the aforementioned application Serial No. 33,404, a description of the material is of interest here as relating to the present invention. Thus in Figure 1, the material comprises a tube 2 braided from filamentary elements 3 of nylon, braided in tightly tensioned condition on a metal core wire 4, and enclosed in an adhering cementitious sheath 5. Nylon is a synthetic protein-like material, the term "nylon" being generic for any long-chain synthetic polymeric amide which has recurring amide groups as an integral part of the main polymer chain, and which is capable of being formed into a filament whose structural elements are oriented in the direction of the axis. As a textile material, nylon has advantages of appreciable elasticity, tensile strength, and resistance to abrasive wear. As is characteristic of textile fabrics, fabrics composed of nylon filamentary elements are essentially sound absorbent and noiseless under impact and contact movement of other materials thereupon.

I may employ for the braid elements 3 of the tube 2, either nylon thread or yarn, a yarn being defined as an extending array of parallel fundamental filaments, either twisted or untwisted, whereas thread is a twist of two or more twisted yarns. In using thread in a present practice, I prefer a nylon sewing thread known in the thread industry as size B and having a weight of about 425 denier (grams per 9000 meters length). With this, I compose each of the braid elements 3 of a pair of such threads, as is illustrated in Figure 1, and in braiding the tube 2 there are twenty-four of such elements (thus forty-eight threads in total) criss-crossed and interwoven as shown, with about thirty-five criss-crosses of the elements (which criss-crosses are termed "picks" by braiders) per inch of braid length. I may also use nylon yarn, and as an equivalent to the above mentioned thread, I may employ 210 denier, 34 filament yarn, using four of such yarns per braid element 3 (or ninety-six yarns in total). These braid designs are exemplary and not limiting. Other designs may be employed within my invention.

The tight braiding of the tube 2 on the core wire 4 defines the interior form of the tube, adapts its inside diameter to a center pin to operate in bearings made from the tube, and improves the interior surface of the tube for center pin contact. Of particular importance, the tight braiding on the wire 4 embodies a desired density and resilience in the tube which are maintained by the cementitious coating 5 after the wire is removed. In relating the inside diameter of the tube to center pins I have found, as an example, that a core wire .043" in diameter adapts bearings made from the bearing material to center pins .052" in diameter.

I have found a nitrocellulose cement satisfactory for the sheath 5. This cement is applied in liquid form to the tube 2 so as to thoroughly coat the tube the tight braiding of which prevents the cement from penetrating into the tube interior. The cement is applied in such an amount that upon hardening it forms an adhering sheath of sufficient tensile properties to retain the desired characteristics in the bearing material and to provide an outside diameter for the material corresponding to the receiving holes in bearing holders. Thus if the receiving holes 6 in a bearing holder 7—see Figure 2 for example—are .106" in diameter I fabricate the bearing material to the same diameter or perchance .107" diameter since the material is slightly compressible and will enter slightly smaller bearing holes.

The bearing material 1 thus described comprises a stiff cylindrical material—in which the sheath 5 contributes appreciably to the stiffness—which may be thrust or pushed into bearing holes in holders, in bearing forming operations such as have been set forth in the aforementioned application Serial No. 33,404. The present invention also admits the use of bearing material and bearing forming operations such as have been specified in the aforementioned application Serial No. 20,316.

In making bearings from the material 1, the material may be thrust into receiving holes 6 in the bifurcated end of a holding member or flange 7, to the inner edges of the holes, is cleanly severed at the outer edges of the holes, and the short sections of core wire 4 remaining within the inserted material 1 in the holder 7 are expelled. As was mentioned in the application Serial No. 33,404, I preferably employ a lead alloy wire— 30% tin, 70% lead—for the core 4, which I have found can be cut cleanly and avoids the occurrence of hard burrs on cutting, which burrs might damage the interior of the tube 2 on expulsion of the core. To attach the bearing material to the holders I may apply either a liquid cement to the sheath 5 or an appropriate solvent for the cementitious sheath, as the bearing material enters the receiving holes. As has been set forth in the applications Serial Nos. 20,316 and 33,404 a reactivating solvent for a cementitious sheath 5 may comprise a "slow" solvent which initially acts as a lubricant in the bearing forming operations and keeps clean the saws or knives used to sever the bearing material therein, but which after a lapse of time attacks the sheath to reactivate it partially to bond the bearings to the holder 7. If the sheath 5 is a hardened nitrocellulose cement, the "slow" solvent may consist of a mixture of Stoddard Solvent (a liquid petroleum product also known as Safety Solvent) two thirds and Cellosolve (ethylene glycol monoethyl ether) one third, by volume.

As further details of the above bearing forming operations, the outer edges of the bearing holes 6 preferably are countersunk to facilitate entrance of the bearing material. Also the bearing material and the forming operations admit of a ready means for initially lubricating a bearing—either by applying a lubricant as the sections of core wire 4 are expelled or by applying lubricant to the core 4 before the tube 2 of the bearing material is braided upon it. As a lubricant, a one per cent solution of usual household soap in water is satisfactory, whereby when the water evaporates the pliant soap remains as a lubricating means. The inner interstices of the tube 2 may function as a repository for the lubricant.

Figure 4 shows the joining of two piano action members by a pivotal connection and Figure 5 illustrates an assembly so connected. The smooth metal center pin 8 is driven as indicated by the arrow in Figure 4 into the two bushings composed of the braided tubes 2 and their encompassing sheaths 5 in the holder or flange 7, with the end of a hammer butt 9 interposed and containing a hole in which the center pin fits tightly. In a complete upright piano about 330 pivotal connections or centers such as have been described, would be employed, with a greater number in a grand piano.

I should like to point out a feature in the present construction, namely that the braid elements 3 of a bearing tube 2 are all disposed diagonally with respect to a center pin 8 which bears against them, as will be noted from the drawings and the foregoing description. Thus all the braid elements are similarly effective in the bearing.

I have stated above that the core wire 4 in the bearing material 1 is somewhat smaller than a center pin to be employed in bearings made from the material. Thus the center pin 8 would be initially somewhat snug in the bearings. However, I have found that due, I believe, to compressional fatigue of the braid in the bearings and to plastic flow of the coatings 5, under pressure by the pin, the center becomes free but firm with the bearings and pin in alinement with moderate radial force between a pin and its bearing assembly, in a satisfactory amount of time, provided the relationship between the core wire and center pin are substantially as described.

In the current practice of the art of making piano action center bearings the wool cloth is cut into strips the width of which is substantially the circumference of a bearing hole, and several bearing holders are strung on each strip so that both bearing holes of a holder encompass a strip with the wool strip circumferential therein. Glue is then applied to appropriate portions of the strip and the bearing holders are moved over the treated portions. The sections of a strip between holders thereon and between the bifurcated ends of the holders are then cut away, with considerable waste of material.

By contrast, it will be observed that the bearing material used in the present invention is employed economically in that, except for the negligible amounts destroyed in severing the material at the outer edges of the bearing holes 6, it is utilized entirely in the bearings. The ejected portions of core wire 4 can be recovered as scrap metal to be remelted and redrawn. Moreover, none of the component materials set forth above in making bearing material or in forming bearing assemblies, are particularly costly. As was also stated in the aforementioned applications Serial Nos. 20,316 and 33,404, the bearing materials utilized in this invention can be made by machinery in continuous-type operations and bearing assemblies can be fabricated by machine operations. Once bearing assemblies are thus formed, no further mechanical operations upon them are required.

Taking up now in detail the attainment of the second stated object of the present invention, namely to provide a bearing assembly such that its operating characteristics are not disturbed by variations in atmospheric humidity, I stated above that the bearing holders 7 may be composed of wood. It is a characteristic of the material wood that changes in atmospheric humidity affect its dimensions, the wood swelling with increase and shrinking with decrease in humidity, due to the moisture which the wood absorbs from a relatively humid atmosphere and discharges into a relatively dry atmosphere.

A further characteristic of wood is that it is especially sensitive across its grain, and relatively insensitive along its grain, to humidity changes. By grain of the wood is meant the direction in which its fibres extend, corresponding in the tree from which the wood is obtained, to the vertical extension of the tree and the extension of its branches. In Figures 2 through 7 of the accompanying drawings I have represented the grain direction in wood bearing holders employed, by the double headed arrows in the figures. Referring now to the enlarged views in Figures 6 and 7, the bearing hole 6 in a bearing construction of Figure 6 enlarges across grain of the wood, with increase in atmospheric humidity, to the elliptical shape diagrammatically shown in Figure 7, and returns upon equivalent decrease in humidity to the circular shape of Figure 6.

The above described sensitivity of wood, in bearing holders in piano action centers made according to the current practice in the art, is somewhat a benefit according to technical studies which I have carried out on such centers, in that the enlargement of the bearing holes under increase in atmospheric humidity compensates partially for the considerable swelling tendency of the wool cloth bearings. This compensation in the current practice, however, is far from adequate, with an undesired effect as noted above.

In a present practice of my present invention, I have discovered that a combination of wood bearing holders and bearings therein of the braided structure of nylon filar elements as described above, provides an almost exactly compensating combination in a piano action center. In this exemplary combination the dimensional sensitivity of the bearings to changes in atmospheric humidity, compensates almost exactly for the dimensional sensitivity of the wood holders in which the bearings and the center pins are held. In this way piano action centers are obtained with smooth operation independent of atmospheric humidity. For bearing holders I prefer to use the wood maple, a dense hard wood which is particularly sensitive dimensionally to changes in atmospheric humidity and which in its class of material, is accurately machinable.

As a preliminary to further discussion of the present invention, I should like to point out still another characteristic of wood, namely that it has two cross-grain dimensional sensitivities to humidity changes, a lesser sensitivity across its annual rings and a greater sensitivity along the rings. The annual rings indicate each the amount of cross-sectional yearly growth of a tree and its branches, from which the wood is obtained, and in a smooth cross-grain surface of wood they are easily seen as typical lines. In maple the sensitivity to humidity along the annual rings is about one-third greater than across the rings.

Thus in Figure 2 of the accompanying drawings the annual rings 10 in a wood bearing holder 7 are illustrated as extending with the axes of the bearing holes 6 whereas in a modified bearing holder 7a of Figure 3 the annual rings 10 are shown as extending across the bearing holes 6. Thus in effect two different materials, having different characteristics, are available for the purposes of this invention.

In the commercial practice of my invention in forming bearing assemblies in large quantities, employing the exemplary construction described above including maple bearing holders and the nylon bearing material as described, the bearing holders will be derived from commercially obtained wood or lumber, kiln dried for the purpose. Unless special selection is exercised the annual rings 10 in the bearing holders will extend in directions varying from that of Figure 2 to that of Figure 3. No particular disadvantage however should result from this. According to a survey of tests which I have made of exemplary bearing assemblies as described, the amount of compensation in the assemblies against the effects of humidity varies from slight undercompensation to slight overcompensation depending upon the direction of the annual rings in the wood holders, but is in no instance disturbing.

In view of the above I prefer to think that the compensating action in an exemplary practice of my invention is due to the following. According to my findings nylon as used here expands about 1% in a dimensional change due to moisture absorption in a variation of atmospheric conditions from 20% to 75% relative humidity. The wood maple under a similar alteration expands about 1½% in a cross-grain direction across the annual rings, and about 2% in a cross-grain direction along the annual rings. In Figures 6 and 7 I have indicated cross-grain points of the wood on opposite sides of a bearing hole 6 in a holder 7 by A, A' and long-grain points on opposite sides of the hole by B, B'. Upon increase in atmospheric humidity the portions of the multifilar nylon bearing between points B, B' and the center pin 8 expand, whereas the wood—along grain—does not. Thus there is increased pressure upon the center pin adjacent points B, B'. However, the considerable expansion of the wood across grain overweighs the expansion of the nylon bearing at points A, A' so that pressure upon the center pin is reduced adjacent A, A'.

The two effects, in the directions A, A' and B, B' essentially compensate for each other and similar compensating effects of various amounts occur at other positions around the structure. Accordingly, the net radial force upon the center pin 8 and thus the friction in the center, is substantially constant independent of atmospheric humidity (except for the slight variations noted above). There is an important factor in this. The bearing material is so constructed of such substance that it is sufficiently- and resiliently-compressible. Thus the portions of the bearing lying in the long grain direction of the wood holder do not exert extreme pressures upon the center pin with increase in humidity.

While the compensating effects described above were analyzed in connection with increase in humidity, it will be understood that respectively reversed but equally compensating effects occur with humidity decrease. I have noted above the use of wood holders having diverse directions of annual rings. In one respect, therefore, my invention is not limited in its construction and use of materials, nor is it limited in other respects. Various woods are available. Furthermore, the bearing material may be altered.

In modifying the bearing material it can be pointed out that the bearing may have a somewhat greater sensitivity to humidity changes than a bearing holder, provided the total wall thickness of the bearing is not too great in comparison with the size of the bearing hole—and provided that upon use of a non-isotropic material, such as wood, for a bearing holder, the bearing has sufficient compressibility so that an increase in radial pressure upon a center pin in a direction of lesser sensitivity of the holder does not appreciably overweigh the decrease in pressure in the diverse direction.

As an example of relative dimensions, in the present exemplary practice of my invention the size of the bearing holes in the holders may be .106″ and the center pins .052″, diameter, as was mentioned earlier in this specification. Thus the total wall thickness of the bearings is about one-half the bearing hole dimension. (The relatively thin wall of the cementitious sheath may be neglected in this respect.) With the relationship between the total wall thickness of a bearing and the size of its bearing hole substantially as given, my conclusions are that the degree of dimensional sensitivity to humidity of textile type bearing material may be as much as twice the maximum sensitivity of the wood composing the bearing holders, without obtaining unsatisfactory results.

I have pointed out the above features of design as residing within the spirit of my invention. In contrast with the foregoing, the wool cloth used in the bearings in piano action centers in the current practice of the art increases about 8% in thickness under a variation in atmospheric relative humidity from 20% to 75%. This degree of expansion is considerably greater than that of the wood in bearing holders in which bearings obtained from the cloth are contained. Moreover, the wall thickness of the bearings is about one-half the hole sizes in the current practice. As a result, piano action centers made according to the current art tighten considerably upon exposure to high humidity, as was stated above. This tightening may result in friciton in the centers as much as 300% or more of the friction under low humidity. By contrast, the friction in the centers in the present invention varies not more than 25% under corresponding humidity changes.

Another disturbing feature in the current practice of the art is that upon incursion of high humidity the wool bearings are often compressed dimensionally beyond their elastic limit. This results in loose centers under low humidity, which is undesired. Nylon, however, is a "tough" textile material with a greater elastic limit. Braided nylon bearings as used in the present invention remain within their elastic limit under high humidity.

As further features of the present invention, I should like to point out that the exemplary bearings and bearing holders described herein are both porous. Thus they readily absorb and release moisture upon changes in atmospheric humidity. Furthermore, I mentioned above that soap may be used as a lubricant in the present invention. Soap is somewhat hygroscopic, changing its moisture content with variations in humidity. With higher humidity the increased moisture content of the soap improves its lubricative effect, which may be advantageous in the present use. For center pins I prefer to use pins composed of a metal alloy known as nickel-silver, which resists corrosion well.

It will be understood that modifications may be made in my invention without departing from its spirit. Having thus described the invention, those features which I claim as new and novel and which I desire to protect by Letters Patent, comprise:

1. A bearing assembly comprising a holder having dimensional sensitivity to changes in humidity, a resiliently compressible bearing, formed of filaments, in said holder and also having dimensional sensitivity to moisture, and a shaft in said bearing holding said bearing in a state of resilient compression, in which assembly the differential of the dimensional sensitivities of the holder and bearing is less than the dimensional limit of the resilient compressibility of said bearing throughout a range of relative humidity of the surrounding atmosphere of substantially 20% to substantially 75%.

2. The structure claimed in claim 1 in which said differential is small and produces over said range of humidity a change in frictional resistance of rotation of said shaft in said bearing not greater than 2 to 1.

3. The structure claimed in claim 1 in which the dimensional change in the bearing over the said range of humidity is not more than substantially twice the dimensional change in the bearing holder.

4. The structure claimed in claim 1 in which the bearing holder has different dimensional sensitivities in different directions therein, and in which the dimensional change in the bearing over the said range of humidity is not more than substantially twice the maximum dimensional change in the bearing holder.

5. The structure claimed in claim 4 in which the bearing holder is of wood and the bearing is formed of nylon filaments.

6. A bearing assembly comprising a holder having different dimensional sensitivities to humidity in diverse directions therein, a bearing dimensionally sensitive to humidity, contained in a hole in the holder, the total wall thickness of the bearing being substantially one-half the size of the said bearing hole, the bearing sensitivity to humidity being less than the dimensional sensitivity of the holder in its direction of greater sensitivity so that upon considerable increase in humidity the radial force upon a shaft within the bearing and radially compressing the bearing is reduced in the direction of greater sensitivity of the holder, the elastic limit of said bearing being at least equal to the compression exerted on said bearing by the bearing holder in the direction of its lesser sensitivity so as not to be compressed therebeyond in the direction of the lesser sensitivity of the bearing holder upon considerable increase in humidity.

7. A bearing assembly as in claim 6, wherein the holder is composed of wood with the grain direction of the wood extending across the said bearing hole.

8. A bearing assembly for piano actions or the like, comprising a wooden support having a hole therein, and a bearing in said hole comprising a braided tubular sleeve formed of nylon filaments cemented into place therein, the hole in said holder extending transverse the grain direction of the wood.

9. A bearing assembly comprising a holder having different dimensional sensitivities to humidity in diverse directions therein, a bearing dimensionally sensitive to humidity, contained in the holder so that the axis of the bearing extends transverse to the directions of sensitivity of the holder, and a shaft in the bearing holding the bearing in a state of resilient compression, the sensitivity of the bearing to humidity being less than the sensitivity of the holder in its direction of greater sensitivity and greater than that of the holder in its direction of lesser sensitivity, the respective positive and negative differential sensitivities compensating for each other over a range of relative humidity of the surrounding atmosphere of substantially 20% to substantially 75% so that the change in frictional rotation of the shaft in the bearing is not greater than 2 to 1.

ARMAND F. KNOBLAUGH.

REFERENCES CITED

The following references are of record in the file of this patent:

UNITED STATES PATENTS

| Number | Name | Date |
|---|---|---|
| 1,369,196 | Semple | Feb. 22, 1921 |
| 2,048,247 | Davis | July 21, 1936 |
| 2,128,087 | Gatke | Aug. 23, 1938 |

FOREIGN PATENTS

| Number | Country | Date |
|---|---|---|
| 118,977 | Great Britain | Sept. 19, 1918 |